(12) United States Patent
Bartlett et al.

(10) Patent No.: US 12,133,521 B2
(45) Date of Patent: Nov. 5, 2024

(54) FIBER COMPOSITE TRUSS PANEL SPRAY BOOM

(71) Applicants: Deere & Company, Moline, IL (US); King Agro Europa, S.L., Picassent (ES)

(72) Inventors: Thomas G. Bartlett, Ankeny, IA (US); Mauro Bolzani, Valencia (ES); Philip E. Ferree, Ankeny, IA (US); Iban Gomez Preciado, Getafe (ES); Carlos Villalba Gomez, Valencia (ES); Joaquin Randle, Valencia (ES); Victor Herráiz González, Valenica (ES)

(73) Assignees: DEERE & COMPANY, Moline, IL (US); KING AGRO EUROPA S.L., Valencia (ES)

( * ) Notice: Subject to any disclaimer, the term of this patent is extended or adjusted under 35 U.S.C. 154(b) by 925 days.

(21) Appl. No.: 17/186,669

(22) Filed: Feb. 26, 2021

(65) Prior Publication Data

US 2022/0132826 A1    May 5, 2022

(30) Foreign Application Priority Data

Oct. 30, 2020    (EP) ..................... 20382946

(51) Int. Cl.
*A01M 7/00* (2006.01)
*A01C 23/00* (2006.01)
(Continued)

(52) U.S. Cl.
CPC ......... *A01M 7/0071* (2013.01); *A01C 23/008* (2013.01); *B05B 1/20* (2013.01); *B05B 15/18* (2018.02)

(58) Field of Classification Search
CPC .............. A01M 7/0071; A01M 7/0075; A01M 7/0053; A01C 23/008; B05B 1/20; B05B 15/18
See application file for complete search history.

(56) References Cited

U.S. PATENT DOCUMENTS 1,645,060 A    10/1927    Kraft
6,837,446 B1    1/2005    Jesse
(Continued)

OTHER PUBLICATIONS

Arris Composites Additive Molding Adds New Dimension to Composites, posted Jul. 27, 2020, https://develop3d.com/manufacture/arris-composites-additive-molding-adds-new-dimension-to-composites/, © 2008-2020 X3DMedia2020.
(Continued)

*Primary Examiner* — Qingzhang Zhou
(74) *Attorney, Agent, or Firm* — KLINTWORTH & ROZENBLAT IP LLP

(57) ABSTRACT

A boom segment is provided for a spray boom assembly configured to carry a spray system of a work vehicle. The boom segment includes a truss panel formed as a unitary structure composed of fiber composite material and configured to support components of the spray system. The truss panel includes a panel wall extending along a length of the truss panel and defining an upper beam, a lower beam, and an array of braces spaced apart and extending diagonally and seamlessly between the upper beam and the lower beam to define a series of truss openings therebetween and a plurality of rigidifying ribs formed integrally with and projecting at an angle from the panel wall.

19 Claims, 14 Drawing Sheets

(51) Int. Cl.
*B05B 1/20* (2006.01)
*B05B 15/18* (2018.01)

(56) References Cited

U.S. PATENT DOCUMENTS

| | | |
|---|---|---|
| D753,729 S | 4/2016 | Ponzinibbio |
| 9,828,771 B2 | 11/2017 | Barker et al. |
| 9,839,211 B2 | 12/2017 | DePriest et al. |
| 10,323,683 B2 | 6/2019 | Tortorella et al. |
| 10,645,916 B2 | 5/2020 | Murphy et al. |
| 2006/0201075 A1* | 9/2006 | Rivas .................. A01M 7/0071 52/111 |
| 2016/0038961 A1 | 2/2016 | Carlson et al. |
| 2017/0216871 A1 | 8/2017 | Klemp, Jr. et al. |
| 2019/0098846 A1 | 4/2019 | Murphy |

OTHER PUBLICATIONS

Design U.S. Appl. No. 29/709,225, filed Oct. 11, 2019.
Utility U.S. Appl. No. 16/507,209, filed Jul. 10, 2019.
European Search Report issued in counterpart application No. 20382946.0 dated Apr. 30, 2021 (09 pages).

* cited by examiner

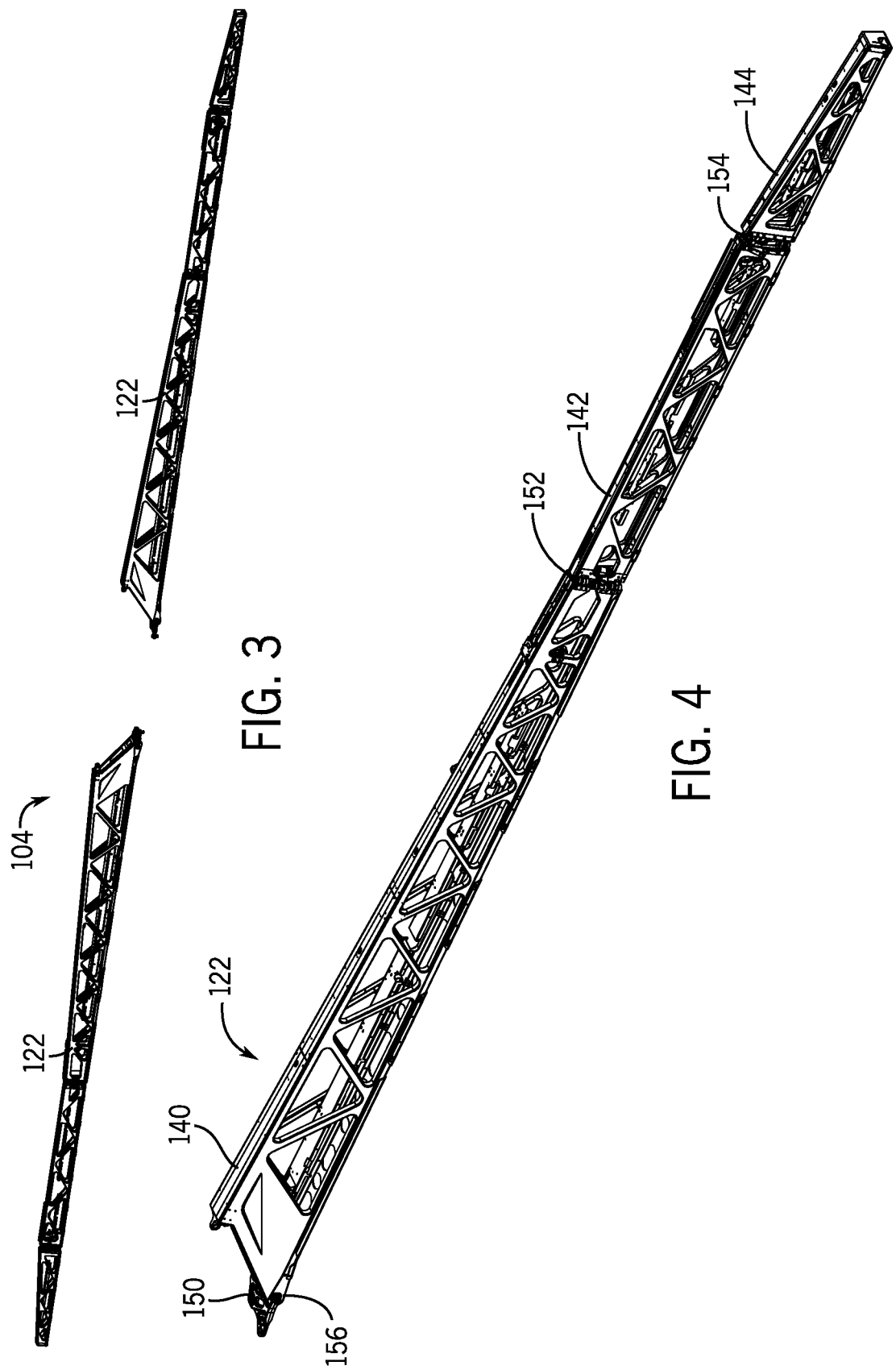

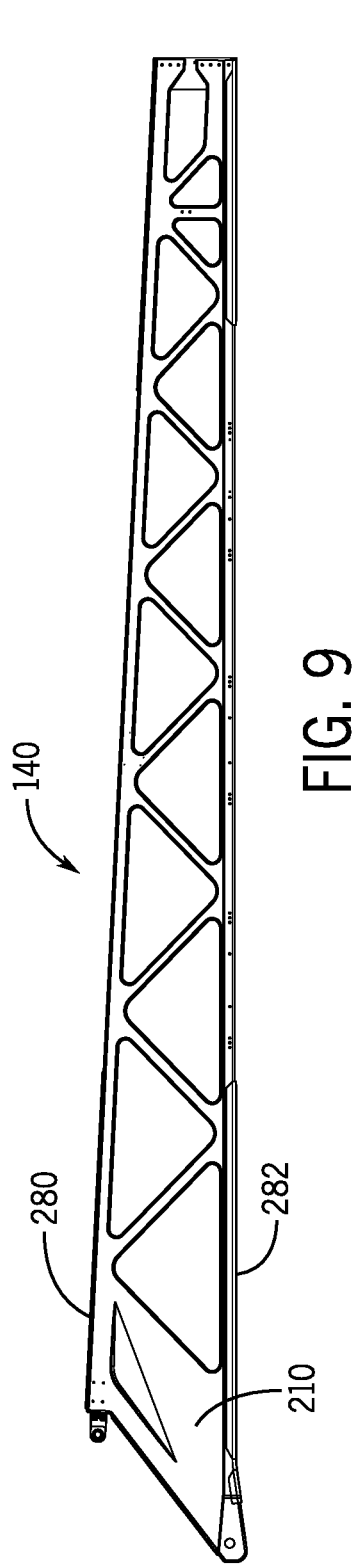
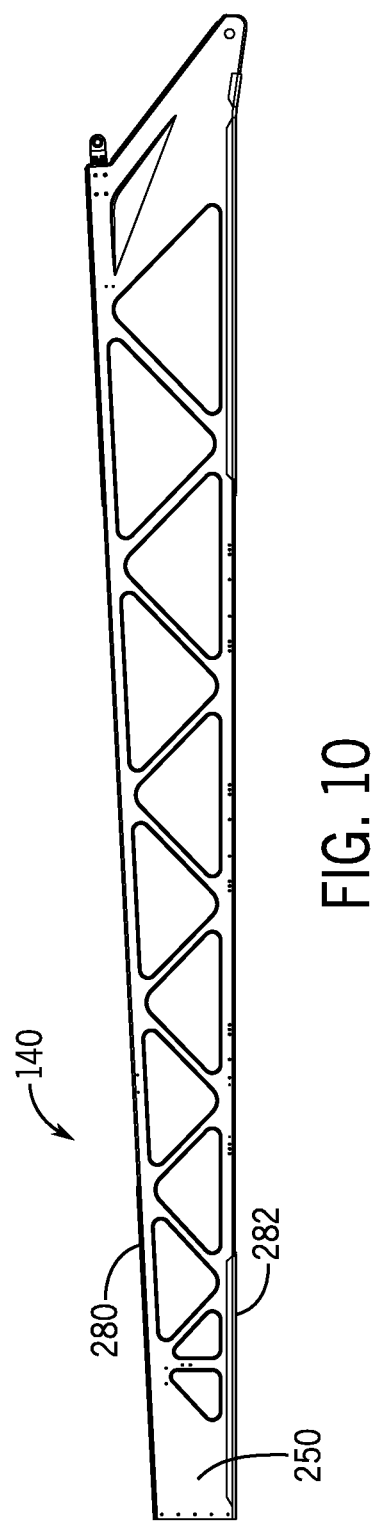

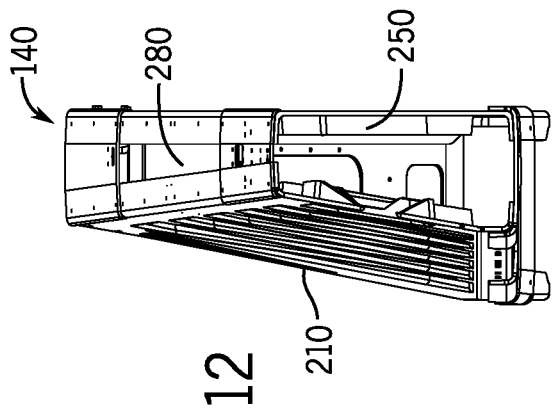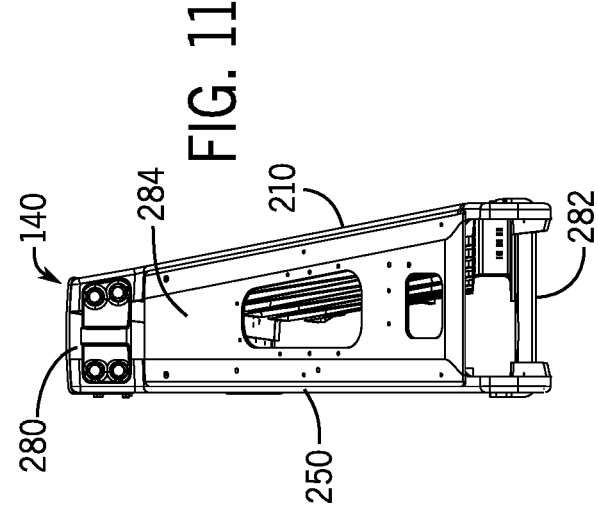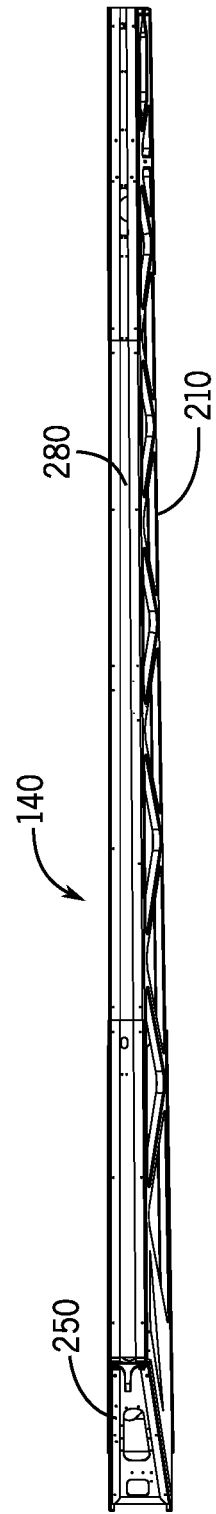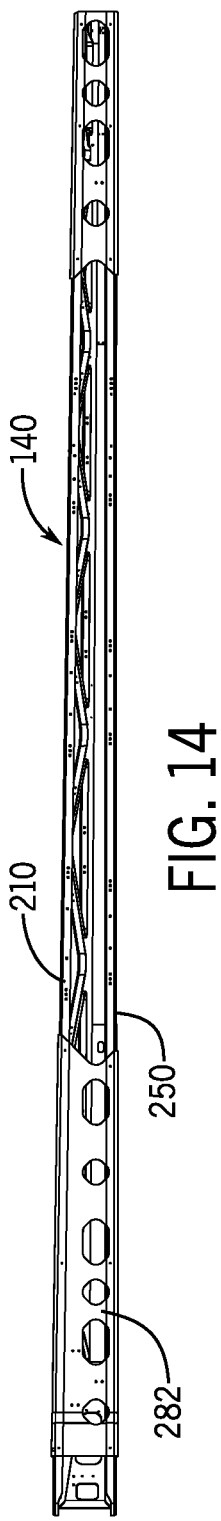

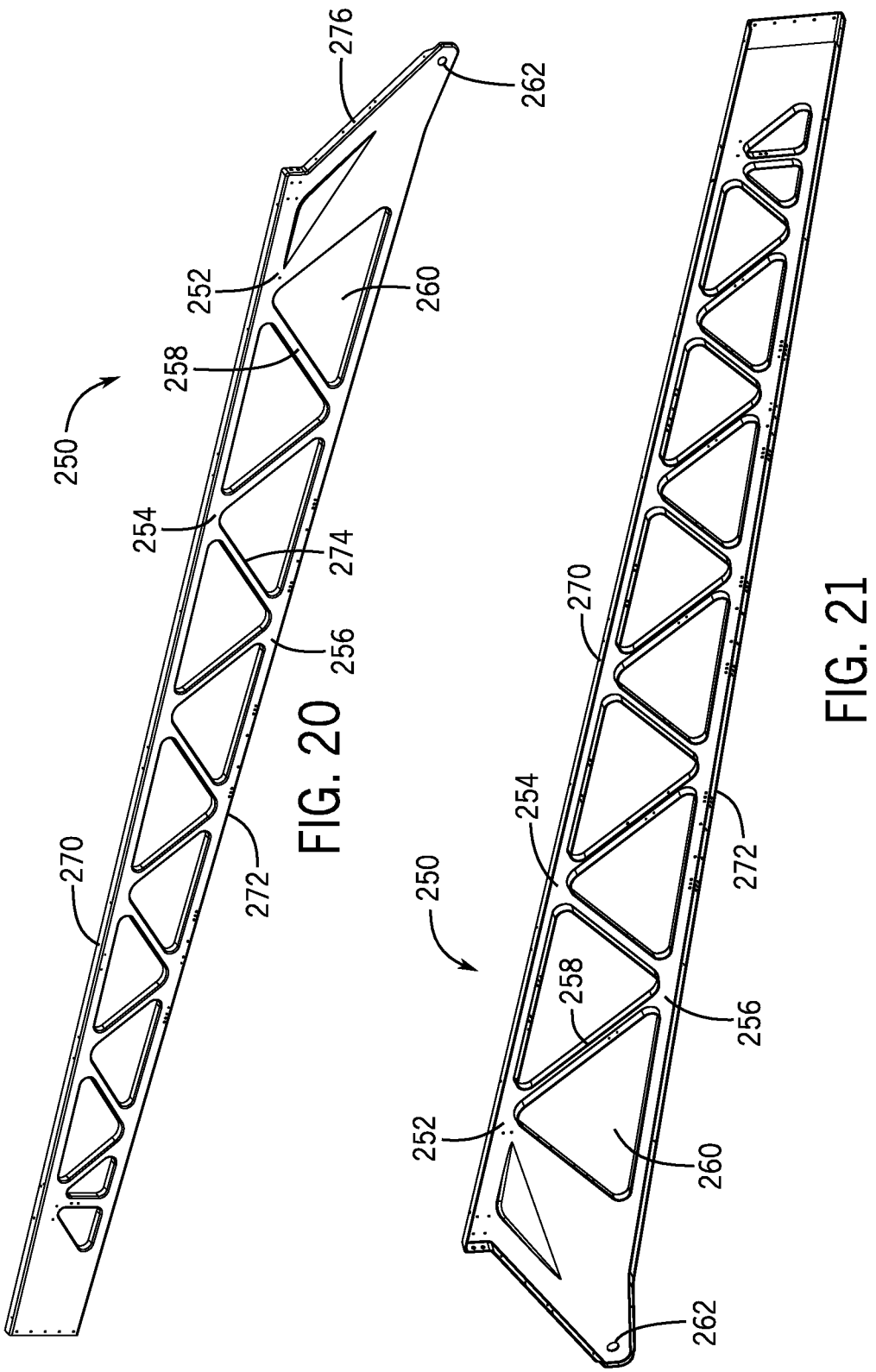

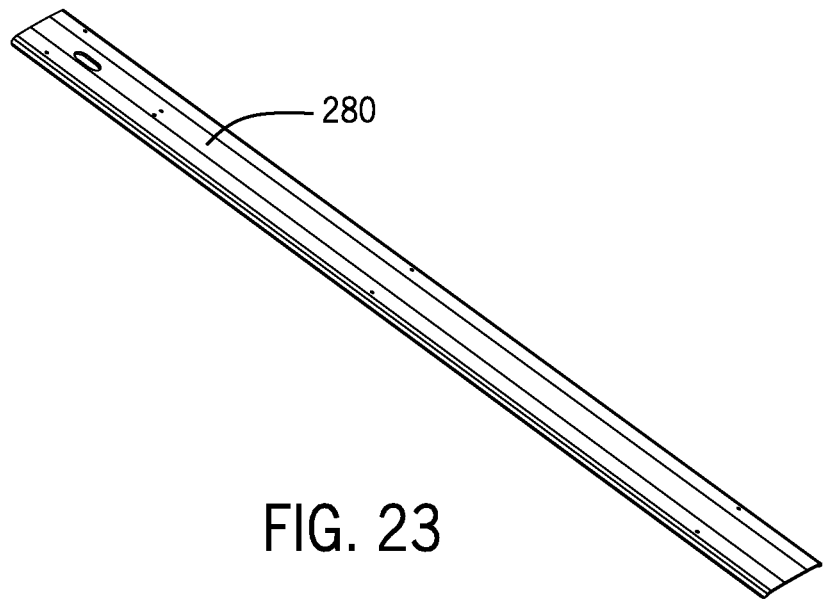
FIG. 23
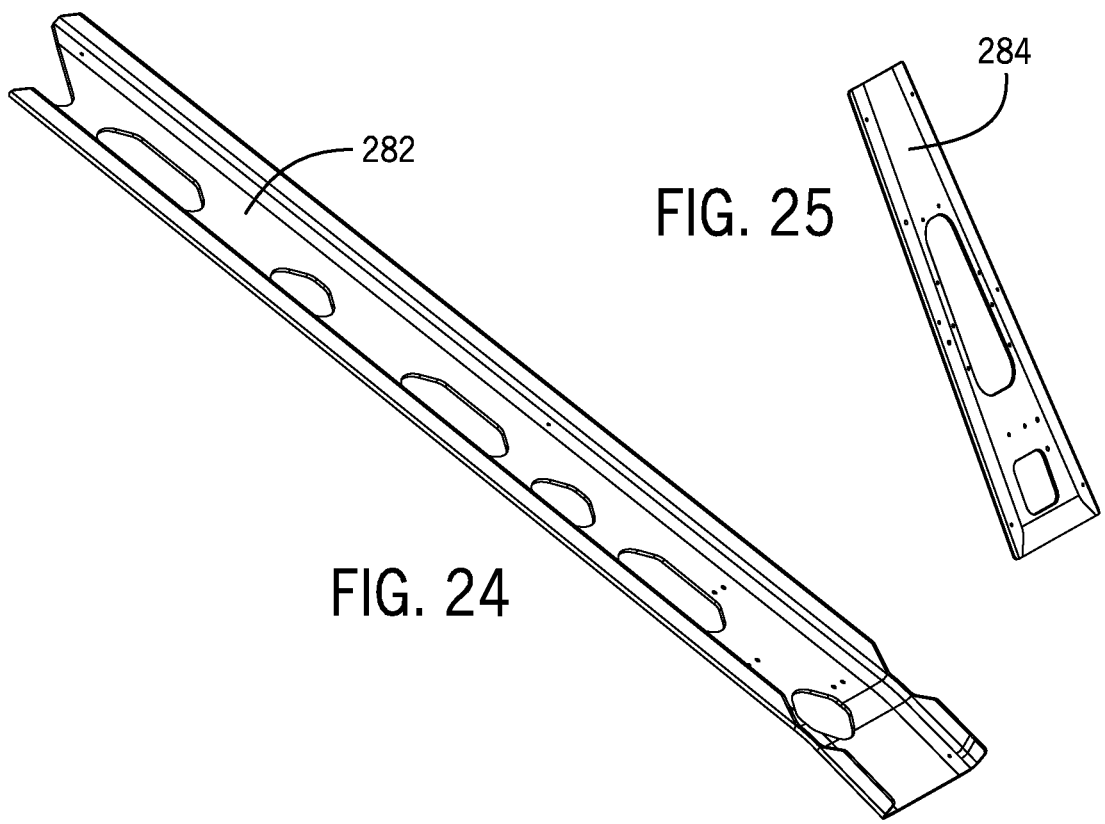
FIG. 24
FIG. 25

FIBER COMPOSITE TRUSS PANEL SPRAY BOOM

CROSS-REFERENCE TO RELATED APPLICATION(S)

This application claims priority under 35 U.S.C. § 119(a) to European application Ser. No. 20382946, filed Oct. 30, 2020.

STATEMENT OF FEDERALLY SPONSORED RESEARCH OR DEVELOPMENT

Not applicable.

FIELD OF THE DISCLOSURE

This disclosure relates to an agricultural work vehicle spray system, and in particular, a boom segment for an agricultural work vehicle spray system.

BACKGROUND OF THE DISCLOSURE

Spray implements are utilized in conjunction with agricultural work vehicles to distribute flowable materials, such as spray solutions, over crop fields. Larger spray implements, such as those found onboard self-propelled sprayers, may have relatively expansive wingspans approaching or exceeding 30 meters in certain instances. Such spray implements typically feature foldable designs, which enable the spray implement to transition between a deployed, field-ready position and a more compact, stowed position for transportation. By common design, a folding spray implement includes two booms assemblies, which project laterally from opposing sides of a center frame assembly attached to the chassis of the work vehicle. To enable folding of the spray implement, hinge assemblies are provided at the interfaces between the center frame assembly and the laterally-extending boom assemblies. Additional hinge assemblies may also be provided along the respective lengths of boom assemblies and specifically at locations between different segments or wings of each boom assembly. An actuation system is provided to facilitate the folding and unfolding of segments at the hinge assemblies between the stowed and deployed positions.

SUMMARY OF THE DISCLOSURE

In one example, a boom segment is provided for a spray boom assembly configured to carry a spray system of a work vehicle. The boom segment includes a truss panel formed as a unitary structure composed of fiber composite material and configured to support components of the spray system. The truss panel includes a panel wall extending along a length of the truss panel and defining an upper beam, a lower beam, and an array of braces spaced apart and extending diagonally and seamlessly between the upper beam and the lower beam to define a series of truss openings therebetween and a plurality of rigidifying ribs formed integrally with and projecting at an angle from the panel wall.

In a further example, a spray boom assembly is provided for a work vehicle having a spray system. The spray boom assembly includes an inner boom segment having an outer end and including a truss panel formed as a unitary structure composed of fiber composite material and configured to support components of the spray system. The truss panel of the inner boom segment includes a panel wall extending along a length of the truss panel and defining an upper beam, a lower beam, and an array of braces spaced apart and extending diagonally and seamlessly between the upper beam and the lower beam to define a series of truss openings therebetween and a plurality of rigidifying ribs formed integrally with and projecting at an angle from the panel wall. The spray boom assembly further includes an outer boom segment having an inner end movably coupled to the outer end of the inner boom segment, the outer boom segment including a truss panel formed as a unitary structure composed of fiber composite material and configured to support components of the spray system. The truss panel of the outer boom segment includes a panel wall extending along a length of the truss panel and defining an upper beam, a lower beam, and an array of braces spaced apart and extending diagonally and seamlessly between the upper beam and the lower beam to define a series of truss openings therebetween and a plurality of rigidifying ribs formed integrally with and projecting at an angle from the panel wall.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIG. 3 is an isometric view of a spray implement removed from the work vehicle of FIG. 1 in accordance with an example embodiment;

FIG. 4 is an isometric view of a spray boom assembly of the spray implement of FIG. 3 in accordance with an example embodiment;

FIGS. 9 and 10 are first and second side views of an inner boom segment of the spray boom assembly of FIG. 4 in accordance with an example embodiment;

FIGS. 11 and 12 are first and second end views of the inner boom segment of the spray boom assembly of FIG. 4 in accordance with an example embodiment;

FIGS. 13 and 14 are top and bottom views, respectively, of the inner boom segment of the spray boom assembly of FIG. 4 in accordance with an example embodiment;

FIGS. 20 and 21 are first and second side views of a trailing truss panel of the inner boom segment of FIG. 4 in accordance with an example embodiment;

FIG. 23 is an isometric view of a top panel of the inner boom segment of FIG. 4 in accordance with an example embodiment;

FIG. 24 is an isometric view of a bottom panel of the inner boom segment of FIG. 4 in accordance with an example embodiment;

FIG. 25 is an isometric view of an end panel of the inner boom segment of FIG. 4 in accordance with an example embodiment;

Figure 1:
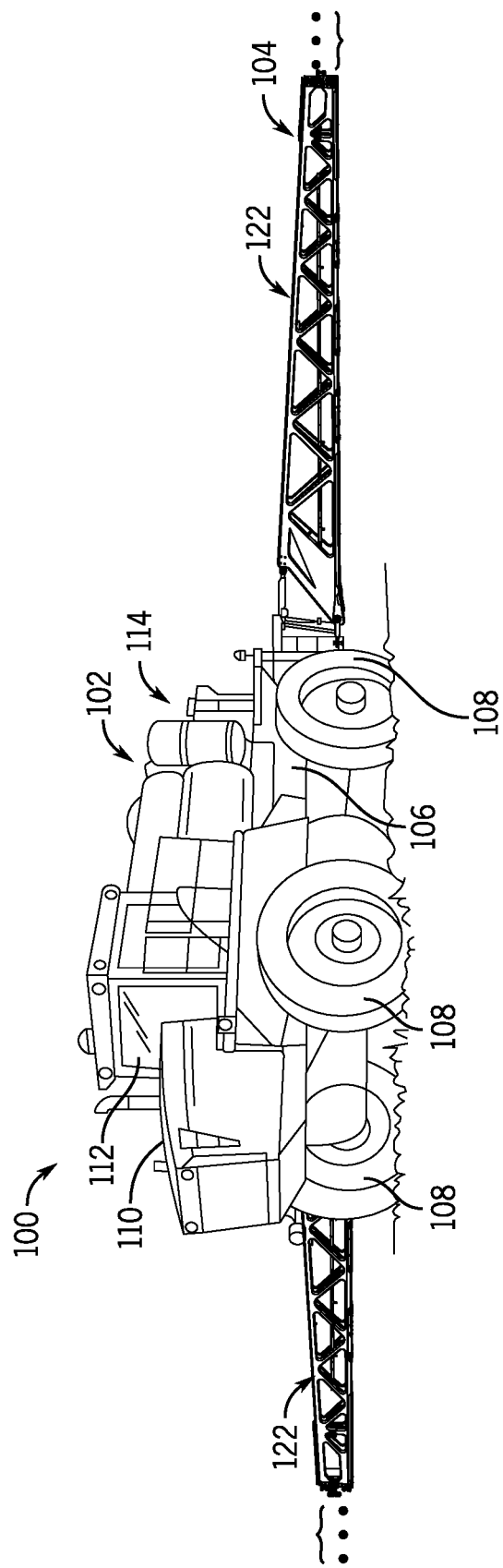
FIG. 1 is an isometric view of an agricultural work vehicle equipped with a spray system in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

As indicated above, larger spray implements utilized in conjunction with agricultural work vehicles commonly feature foldable designs. Such designs enable a foldable spray implement to transition between a deployed, field-ready position and a relatively compact, stowed position for transportation. A key physical parameter of folding spray implements is peak fold height; that is, the maximum height or apex (as measured vertically from the plane of the ground) reached by any portion of the folding spray implement when transitioning between the stowed and deployed positions. In many instances, it is desirable to minimize the peak fold height of a folding spray implement. Regulations have been adopted in certain regions of the world limiting the peak fold height of folding spray implement to specified thresholds.

To address these challenges, boom assemblies of the spray implements have been divided or segmented into a number of segments, arms, or wings, which are joined by hinge or pivot assemblies that may be folded horizontally. At increased lengths, weight and strength become issues.

These and other issues are addressed by providing a spray boom assembly having boom segments, each with truss panel formed as a unitary structure composed of fiber composite material and configured to support components of the spray system. The truss panel may include a panel wall defining an upper beam, a lower beam, and an array of braces spaced apart and extending diagonally and seamlessly between the upper beam and the lower beam to define a series of truss openings therebetween. Moreover, the truss panel may include a plurality of rigidifying ribs formed integrally with and projecting at an angle from the panel wall. One or more of these truss panels may be combined into an overall boom segment with advantageous weight and strength characteristics, as well as internal cavities or channels for housing spray equipment. In some examples, the truss panels may be formed by a laminate of carbon fiber composite layers in which the layers are selected for one or more of layer thickness, fiber type and fiber orientation, particularly in areas of increased stress concentration. The resulting segments provide a boom assembly with a minimal number of fold joints and a low peak fold height at advantageous weight and strength characteristics.

Various orientations and directions are discussed below. For example, the term "fold axis," as appearing herein, refers to the rotational axis or hinge line of a fold joint or hinge assembly about which named portions of a folding spray implement (e.g., the boom assemblies) rotate during transitions between stowed and deployed positions. The term "longitudinal" refers to direction parallel to the length of the boom assemblies or segments (e.g., a generally horizontal or "side to side" orientation relative to the vehicle when the boom assemblies or segments are deployed); the term "lateral" refers to the direction parallel to the width of the boom assemblies (e.g., a generally horizontal and "forward/aft" orientation relative to the vehicles when the boom assemblies or segments are deployed); and the term "transverse" refers to the direction parallel to the height of the boom assemblies (e.g., a generally vertical orientation relative to the boom assemblies or segments when deployed).

Example agricultural work vehicles and folding spray boom assemblies that address the issues raised above will now be described in connection with FIGS. 1-28.

FIG. 1 is an isometric view of a self-propelled work vehicle (or sprayer) 100 equipped with a spray system 102 that includes a spray implement 104, as illustrated in accordance with an example embodiment of the present disclosure. The spray implement 104 is mounted to the rear or aft end of a chassis 106 of the work vehicle 100 in the illustrated example; however, in further embodiments, the spray implement 104 may be mounted to another portion of the work vehicle 100 (e.g., the front end of the chassis 106) or instead, implemented as a towable unit. The chassis 106 of the work vehicle 100 is supported by a number of ground-engaging wheels 108, which are driven by an engine 110 (schematically referenced) contained in an engine compartment adjacent an operator station or cabin 112 of the work vehicle 100.

In addition to the spray implement 104, the spray system 102 includes a spray material delivery arrangement 114 carried by the chassis 106 with a supply tank that holds and supplies a spray solution (or other liquid material) for distribution. As described below, the spray solution is distributed via a number of spray system equipment (e.g., nozzles, valves, feed pipes, supply pipes, lines, flexible tubing, etc.) as the work vehicle 100 travels over the field under operator command or under autonomous command.

Figure 2:
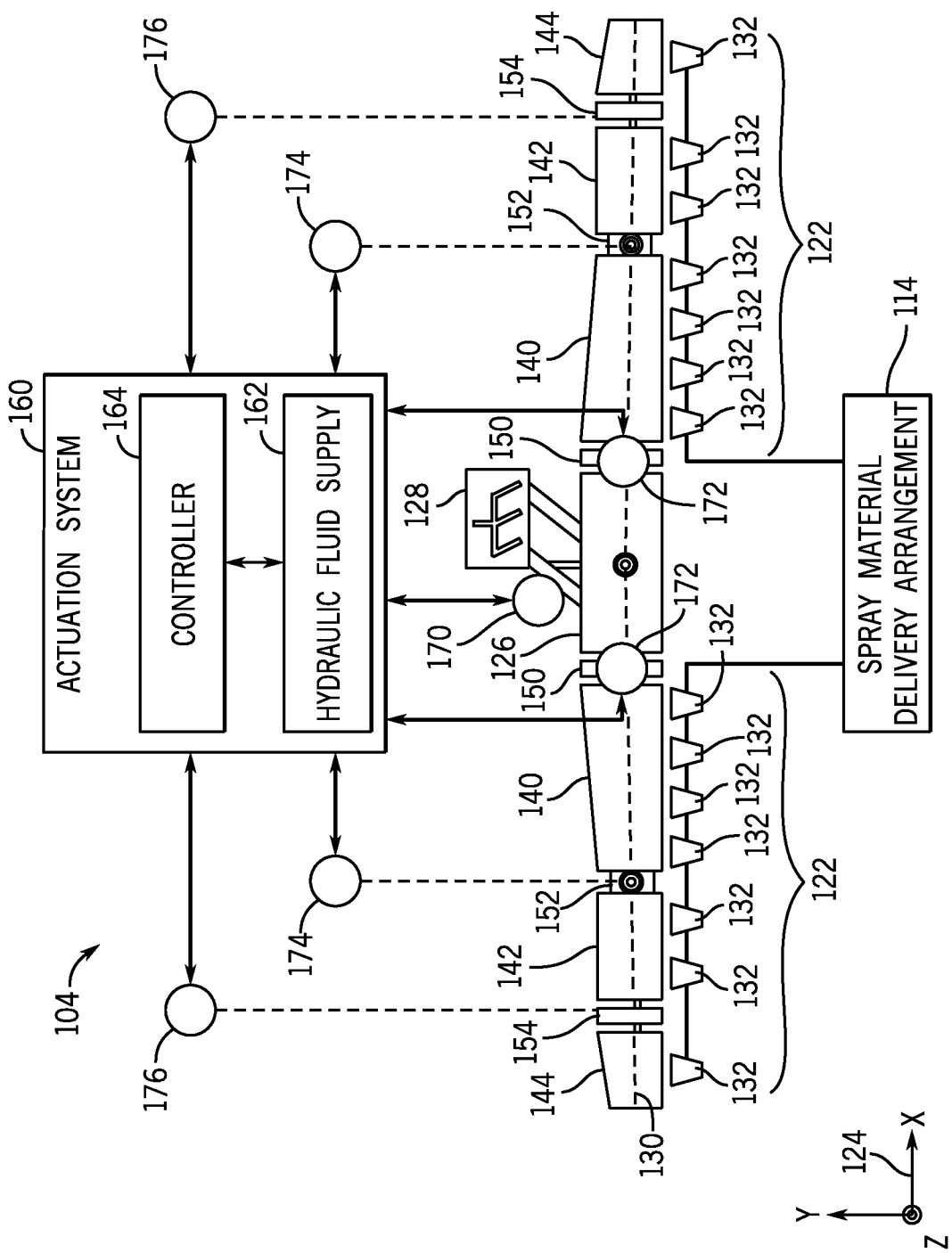
FIG. 2 is a schematic view depicting the spray system of FIG. 1 in accordance with an example embodiment.

The components of the spray system 102 are described in greater detail in the schematic block diagram of FIG. 2. As shown, the example spray implement 104 of the spray system 102 includes two boom assemblies 122 that, when deployed, extend from each side of the work vehicle 100 in a generally longitudinal orientation. In the discussion herein, the term "longitudinal" refers to direction parallel to the length of the boom assemblies 122 (e.g., the x-axis of the legend 124 of FIG. 2); the term "lateral" refers to the direction parallel to the width of the boom assemblies 122 (e.g., the y-axis of the legend 124 of FIG. 2); and the term "transverse" refers to the direction parallel to the height of the boom assemblies 122 (e.g., the z-axis of the legend 124 of FIG. 2). The two boom assemblies 122 are substantially identical in the illustrated example and will be consequently described below as such, with like reference numerals utilized to identify like structural components. It is possible, however, for the boom assemblies 122 to differ relative to one another to varying extents in further implementations of the folding spray implement 104.

The boom assemblies 122 of the folding spray implement 104 are joined to opposing sides of a center frame assembly 126. The center frame assembly 126 is, in turn, mounted to the chassis 106 of the self-propelled work vehicle 100 via one or more bar linkages 128 (or another mechanical linkage). The center frame assembly 126 may have various constructions suitable for supporting the boom assemblies 122.

The boom assemblies 122 are each principally constructed of a frame, truss, or skeletal structures, as discussed in greater detail below. In practice, the boom assemblies 122 of the folding spray implement 104 may have various constructions suitable for supporting its own weight during operation, storage, and travel. Moreover, the boom assemblies 122 support various types of spray equipment 130 (schematically represented in FIG. 2) in appropriate positions along the lengths of the boom assemblies 122. Such spray equipment 130 may include fluid conduits, wiring, pumps, valves, sensors, cameras, electronics, and the like. One example of such spray equipment 130 includes an array of spray nozzles 132.

Generally, and as schematically depicted in FIG. 2, each of the boom assemblies 122 may be divided or segmented into a number of different boom segments (or arms or wings) 140, 142, 144 that are pivotally or hingedly joined in an end-to-end relationship at hinge assemblies 150, 152, 154, 156. In the illustrated example, each boom assembly 122 includes a first (or "inner") boom segment 140, a second (or "outer") boom segment 142, and a third (or "breakaway") boom segment 144. The inner boom segment 140 is joined to the center frame assembly 126 at a first (or inner) pivot hinge assembly 150 and at a tilt hinge assembly 156; the outer boom segment 142 is joined to the inner boom segment 142 at a second (or outer) pivot hinge assembly 152; and the breakaway boom segment 144 is joined to the outer boom segment 144 at a third (or breakaway) pivot hinge assembly 154. Generally, the pivot hinge assemblies 150, 152, 154 enable the respective boom segments 140, 142, 144 to rotate or pivot horizontally (e.g., each about a vertical axis) between unfolded or deployed positions (as shown in FIGS. 1 and 2) and stowed or travel positions in which the boom segments 140, 142, 144 are folded onto each other at approximately 180° (e.g., as an alternating or accordion fold). The tilt hinge assembly 156 enables the tilting or raising of the outward end of the boom assemblies 122 at a junction between the inner boom segment 140 and the center frame assembly 126. In other examples, the boom assemblies 122 can include a greater number of pivotally-joined wings or segments, a fewer number of pivotally-joined wings or segments, or only a single wing or segment. In addition to horizontal folding between deployed and stowed positions, one or more of the boom segments 140, 142, 144 may be configured to at least partially pivot in a vertical plane (e.g., along a generally horizontal axis). In particular, the inner boom segment 140 may be configured to pivot vertically relative to the center frame assembly 126.

As also schematically illustrated in FIG. 2, the example folding spray implement 104 further contains an actuation system 160. The actuation system 160 may be hydraulic, pneumatic, and/or electrical in nature; and, generally, may assume any form suitable for transitioning the folding spray implement 104 between deployed and stowed positions in accordance with operator commands. As one example, actuation system 160 includes a hydraulic fluid supply 162 and a controller 164 operably coupled to the supply 162. During operation, the hydraulic fluid supply 162 exchanges pressurized hydraulic fluid with a number of actuators (e.g., hydraulic cylinders) 170, 172, 174, 176, with the conduit connections. In one example, the actuators 170, 172, 174, 176 include at least one tilt or lift cylinder 170, one or more frame-to-wing fold cylinders 172, and a number of wing-to-wing fold cylinders 174, 176. Although cylinders are described as the actuators 170, 172, 174, 176, other types of actuation mechanisms may be provided.

Generally, the controller 164 of the actuation system 160 may assume any form suitable for performing the functions described herein. Accordingly, the controller 164 may encompass or be associated with one or more processors, computer-readable memories, power supplies, storage devices, interface cards, and other standardized components. The controller 164 may also include or cooperate with any number of firmware and software programs or computer-readable instructions designed to carry-out the various process tasks, calculations, and control functions described herein.

As noted, the actuation system 160 is configured to selectively transition the folding spray implement 104 between stowed and deployed positions in accordance with operator commands. In so doing, the actuation system 160 progresses the folding spray implement 104 through a sequence of controlled motions when unfolding the spray implement 104 into the deployed position or, conversely, when returning the spray implement to the stowed position from the deployed position. For example, the actuation system 160, particularly the controller 164, may command the various actuators 170, 172, 174, 176 to fold, unfold, and/or tilt the segments 140, 142, 144, as appropriate.

The details of the spray implement 104 are discussed in greater detail with reference to FIGS. 3-28. As described below, the boom segments 140, 142, 144 are generally formed by unitary fiber composite truss structures that function to advantageously provide appropriate strength characteristics at reduced weight. In the descriptions of FIGS. 3-28 below, many of the spray system components have been removed to avoid visually obstructing structural portions of the spray implement 104. The spray implement 104 and the work vehicle 100 may assume various other forms in further embodiments, with FIGS. 3-28 illustrating but one of many possible physical implementations of the spray implement 104 and the self-propelled work vehicle 100.

As shown, FIG. 3 is an isometric view of the spray boom assemblies 122 of the spray implement 104 removed from the center frame assembly 126 and the other aspects of the work vehicle 100; and FIG. 4 is an isometric view of one of the spray boom assemblies 122, e.g., the left spray boom assembly 122. As noted above, each spray boom assembly 122 includes the inner boom segment 140, the outer boom segment 142, and the breakaway segment 144. The inner boom segment 140 is joined to the center frame assembly 126 with the inner hinge assembly 150 and the tilt hinge assembly 156; the outer boom segment 142 is joined to the inner boom segment 140 with the outer hinge assembly 152; and the breakaway boom segment 144 is joined to the outer boom segment 142 with the breakaway hinge assembly 154.

Figure 5:
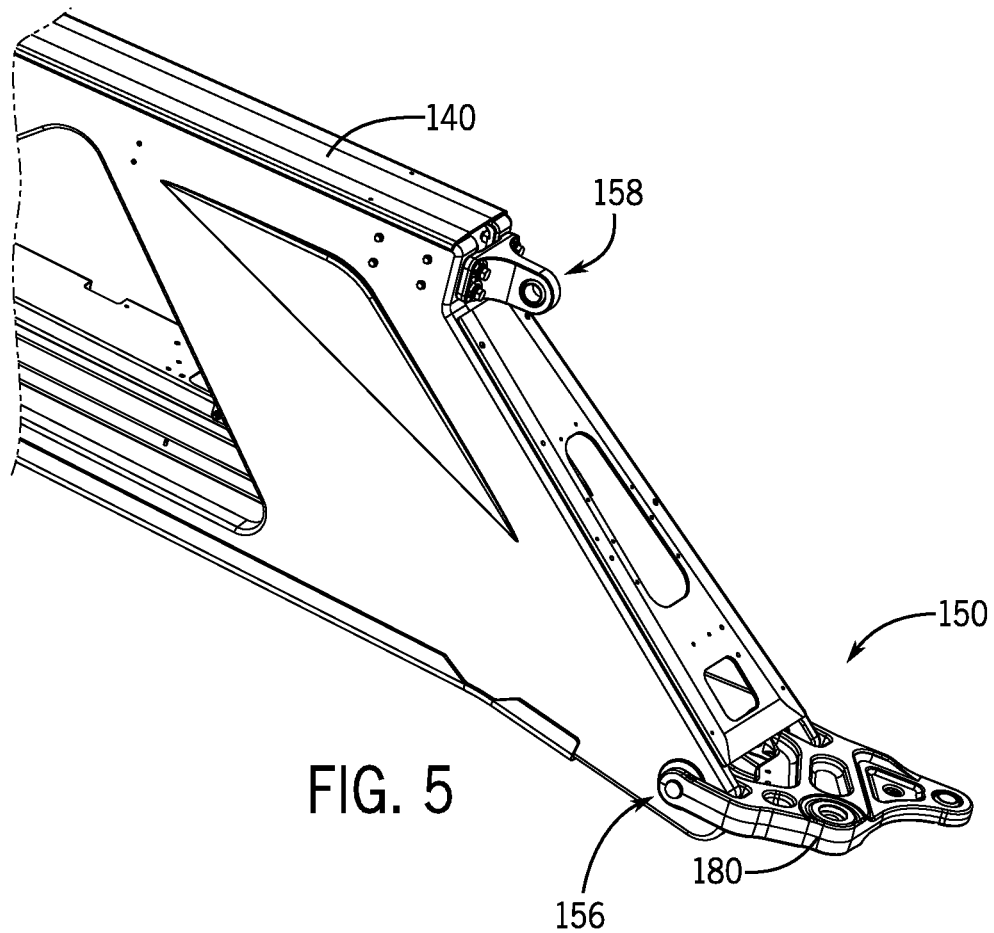
FIG. 5 is an isometric view of an inner hinge assembly of the spray boom assembly of FIG. 4 in accordance with an example embodiment.
Figure 6:
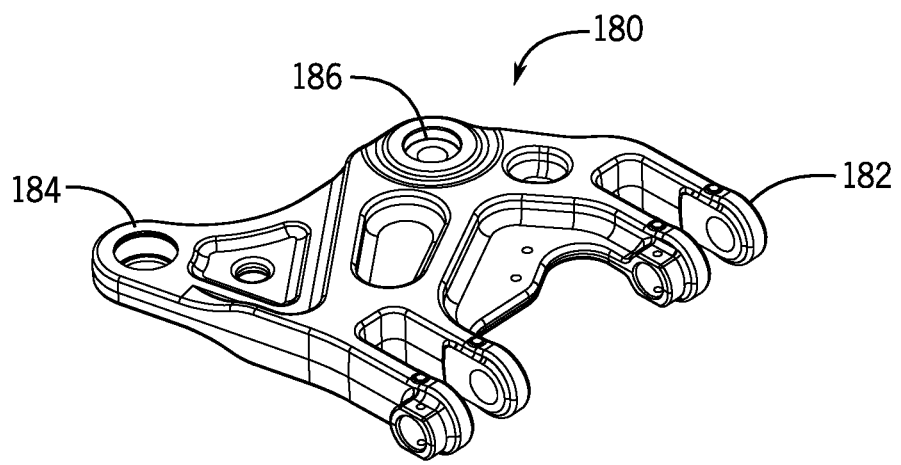
FIG. 6 is an isolated isometric view of a hinge plate of the inner hinge assembly of FIG. 5 in accordance with an example embodiment.

The hinge assemblies 150, 152, 154, 156 are more clearly depicted in the views of FIGS. 5-8. In particular, FIG. 5 is an isometric view of an inner end of the inner boom segment 140 on which the at least portions the inner hinge assembly 150 and the tilt hinge assembly 156 are mounted or formed. The inner hinge assembly 150 includes a hinge plate 180 mounted on a lower portion of the end of the inner boom segment 140 and that is shown in greater detail in the isolated view of FIG. 6. The hinge plate 180 includes one or more mounting flanges 182 that secure the hinge plate 180 to cooperating mounting positions on the inner boom segment 140, an actuator mount 184 configured to be coupled to a pivot actuator (e.g., actuator 172), and a pivot bearing 186 that is secured to a vertical pivot element mounted on the center frame assembly 126. In this manner, the pivot actuator (e.g., actuator 172) may pull or push the actuator mount 184 to pivot the hinge plate 180 and the attached inner boom segment 140 about a vertical axis defined by the pivot bearing 186. Additionally, the hinge plate 180 may also form part of the tilt hinge assembly 156, along with an actuator mount 158 secured to an upper portion of the inner boom segment 140. A tilt actuator (e.g., actuator 170) may be secured to the actuator mount 158 such that the actuator pushes or pulls the inner boom segment 140 to tilt about the horizontal axis defined by the mounting flanges 182 of the hinge plate 180 secured to the lower portion of the inner boom segment 140.

Figure 7:
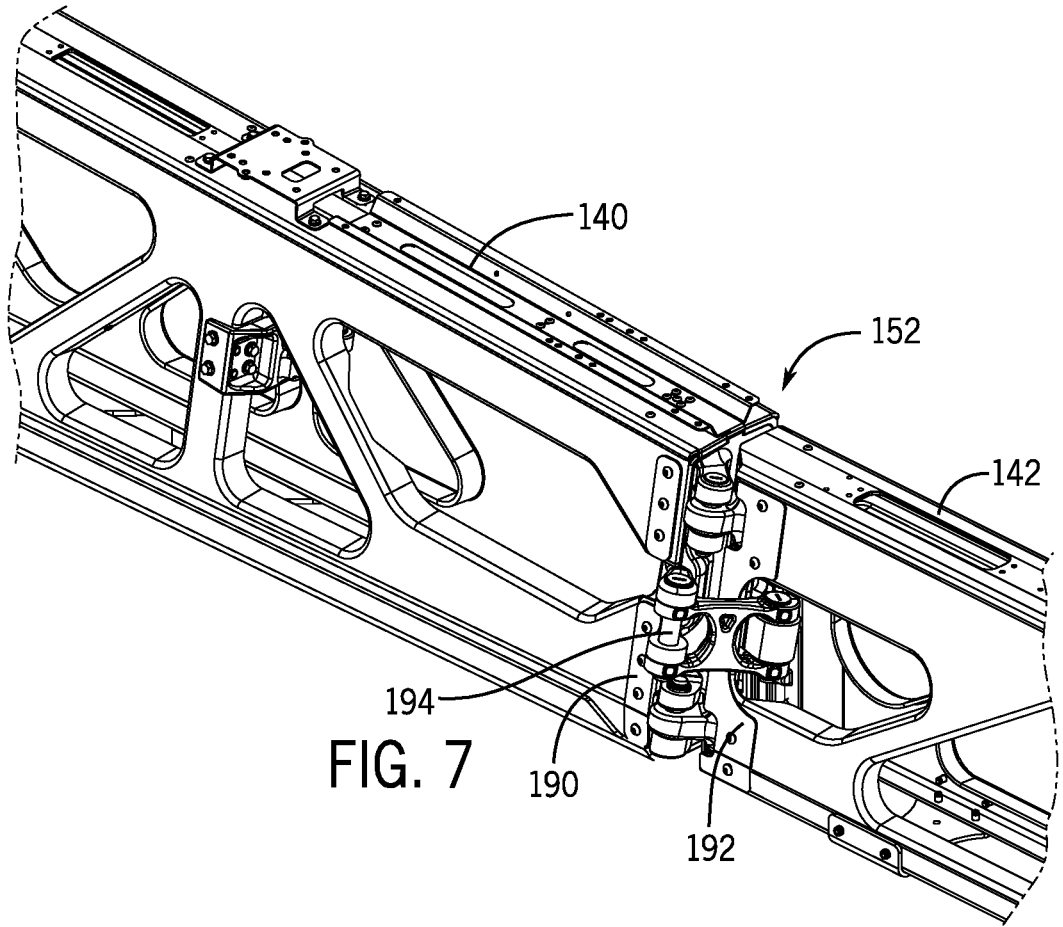
FIG. 7 is an isometric view of an outer hinge assembly of the spray boom assembly of FIG. 4 in accordance with an example embodiment.

The isometric view of FIG. 7 depicts the outer hinge assembly 152 between the inner boom segment 140 and the outer boom segment 142. As shown, the outer hinge assembly 152 includes an inner bracket 190 on the inner boom segment 140, an outer bracket 192 on the outer boom segment 142, and connection elements 194 that join, and facilitates pivoting between, the inner and outer brackets 190, 192.

Figure 8:
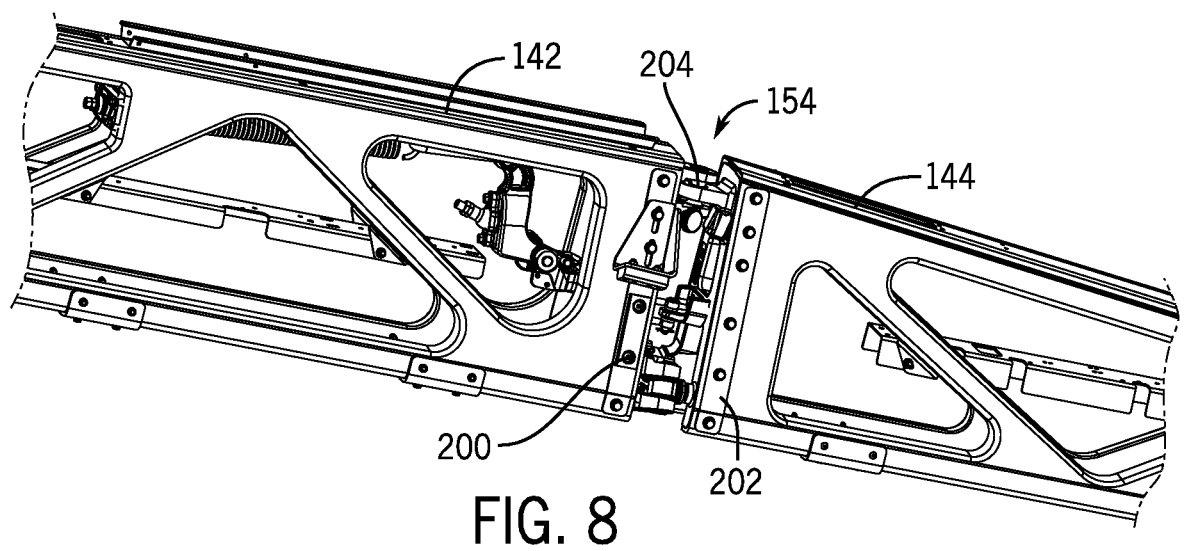
FIG. 8 is an isometric view of a breakaway hinge assembly of the spray boom assembly of FIG. 4 in accordance with an example embodiment.
Figure 15:
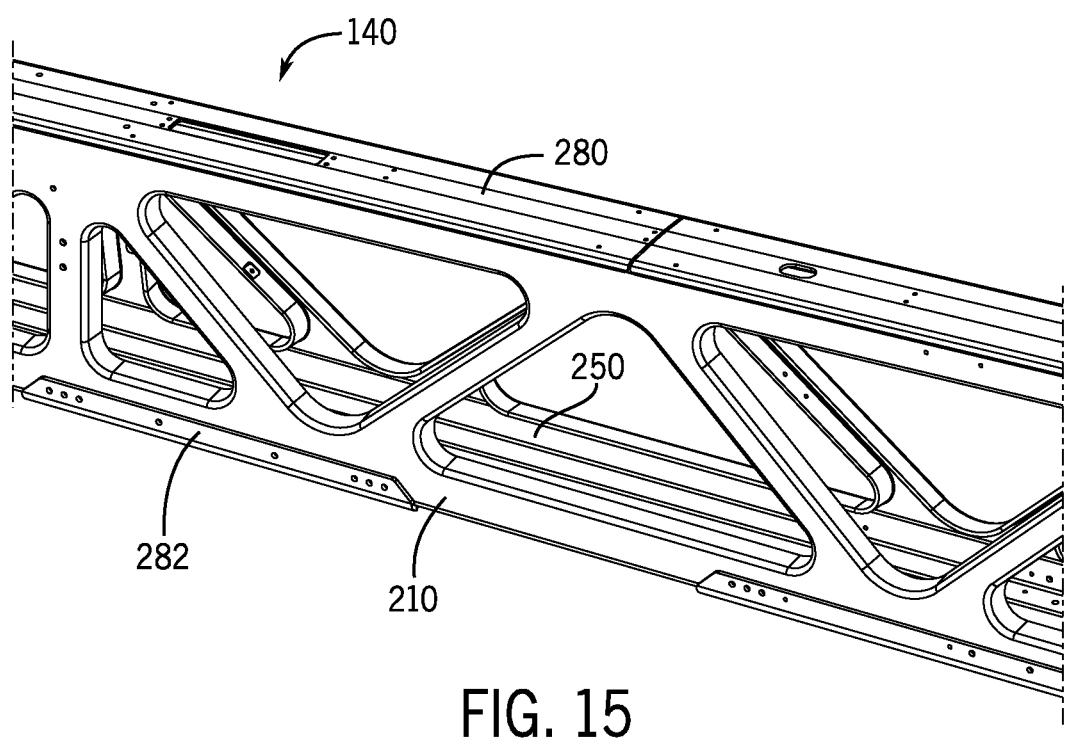
FIG. 15 is a closer, partial isometric side of the inner boom segment of the spray boom assembly of FIG. 4 in accordance with an example embodiment.

The isometric view of FIG. 8 depicts the breakaway hinge assembly 154 between the outer boom segment 142 and the breakaway segment 144. As shown, the breakaway hinge assembly 154 includes an outer bracket 200 on the outer boom segment 144, a breakaway bracket 202 on the breakaway boom segment 144, and connection elements 204 that join, and facilitate pivoting between, the outer and breakaway brackets 200, 202.

Now that a basic description of the overall spray boom assembly 122 has been provided, additional details regarding the construction and structural configuration of the individual boom segments 140, 142, 144 will now be described. The inner boom segment 140 is described in greater detail below with reference to FIGS. 9-28, although the discussion below may also be applicable to one or both of the other boom segments 142, 144.

Figure 16:
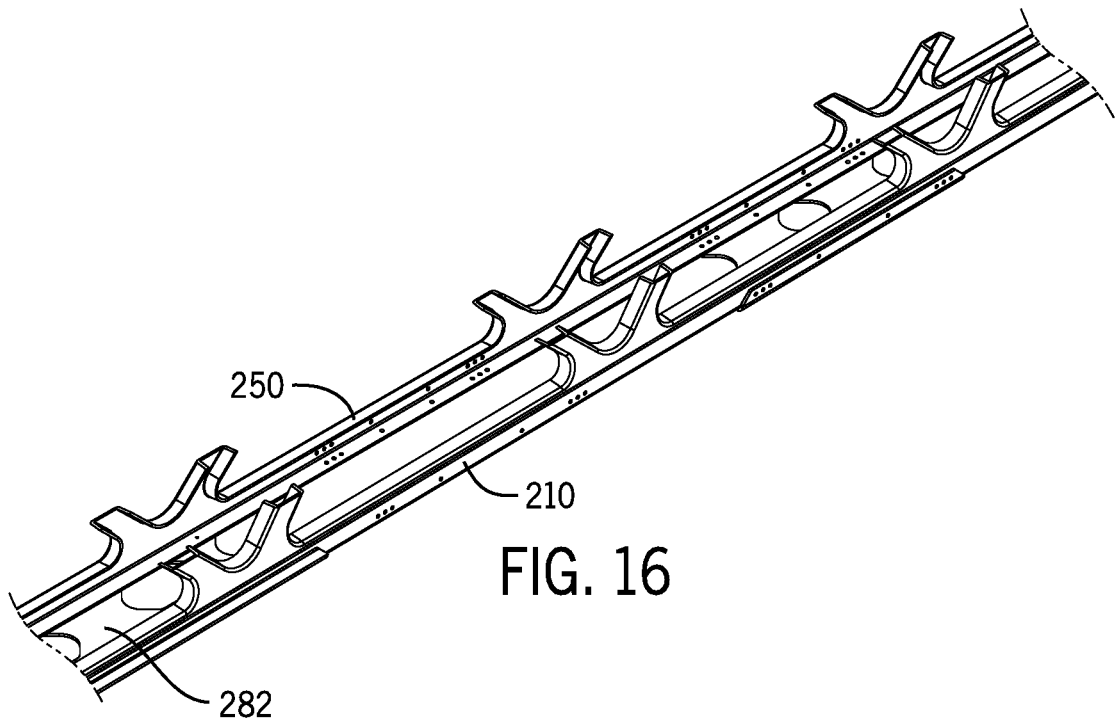
FIGS. 16 and 17 are first and second cross-sectional views of the inner boom segment of the spray boom assembly of FIG. 4 in accordance with an example embodiment.
Figure 17:
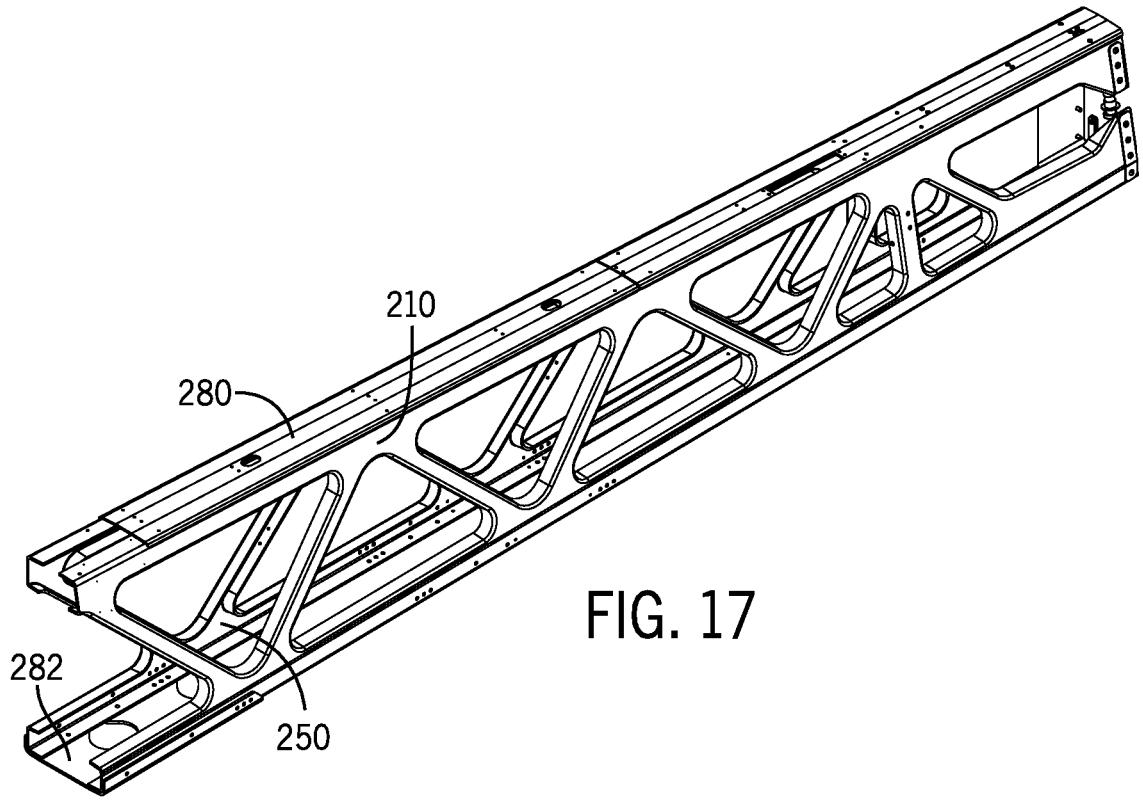

Reference is initially made to FIG. 9, which is a front or leading side view of the inner boom segment 140; FIG. 10, which is a rear or trailing side view of the inner boom segment 140; FIG. 11, which is an inner end view of the inner boom segment 140; FIG. 12, which is an outer end view of the inner boom segment 140; FIG. 13, which is a top view of the inner boom segment 140; FIG. 14, which is a top side view of the inner boom segment 140; and FIG. 15, which is a partial isometric side view of the inner boom segment 140. Further, FIG. 16 is a first isometric sectional view through a portion of the inner boom segment 140, and FIG. 17 is a second isometric sectional view through a portion of the inner boom segment 140.

As shown, the inner boom segment 140 is formed by a first (or leading) truss panel 210 and a second (or trailing) truss panel 250. In some examples, the inner boom segment 140 may also include a series of upper panels 280, a series of lower panels 282, and an end panel 284. As described below, the inner boom segment 140 is formed by securing the leading and trailing truss panels 210, 250 to one another with the upper and lower panels 280, 282 (e.g., with adhesives, rivets or other securements). In one example, rivets may be used to align the upper and lower panels 280, 282 relative the leading and trailing truss panels 210, 250 to enable an adhesive to set. As also described below, the leading and trailing truss panels 210, 250 are generally integral, single-piece structures (i.e., seamless and jointless) formed by fiber composite materials. Additional details will be provided below after a describing the resulting structures.

Figure 18:
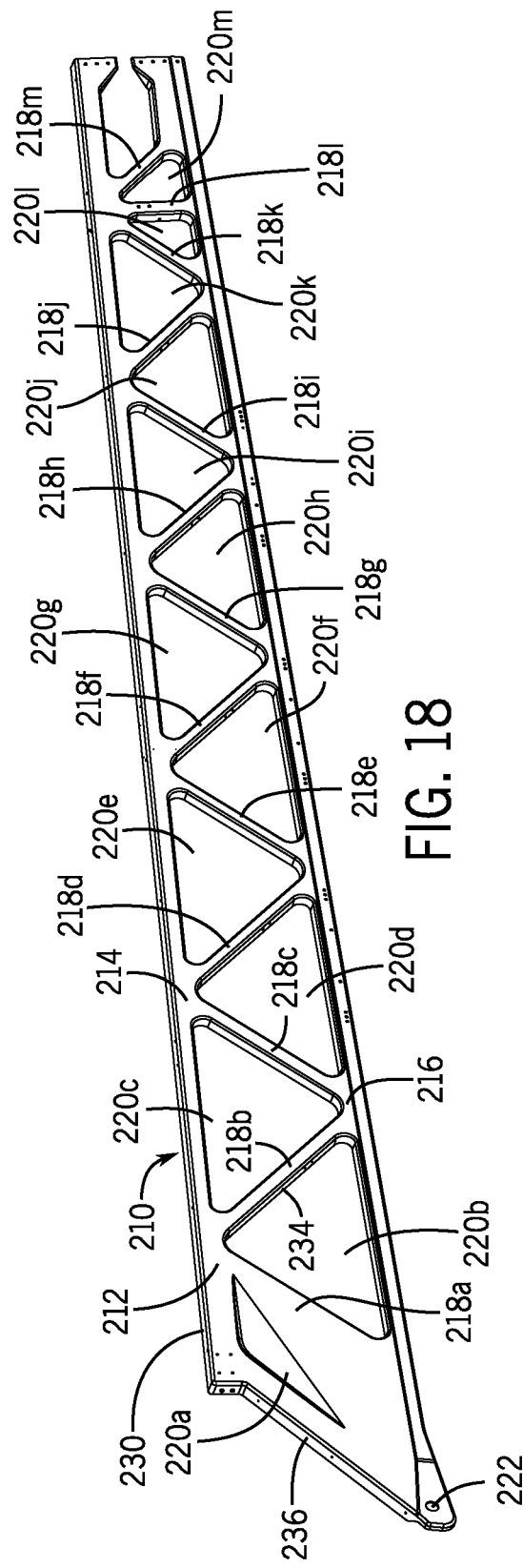
FIGS. 18 and 19 are first and second side views of a leading truss panel of the inner boom segment of FIG. 4 in accordance with an example embodiment.
Figure 19:
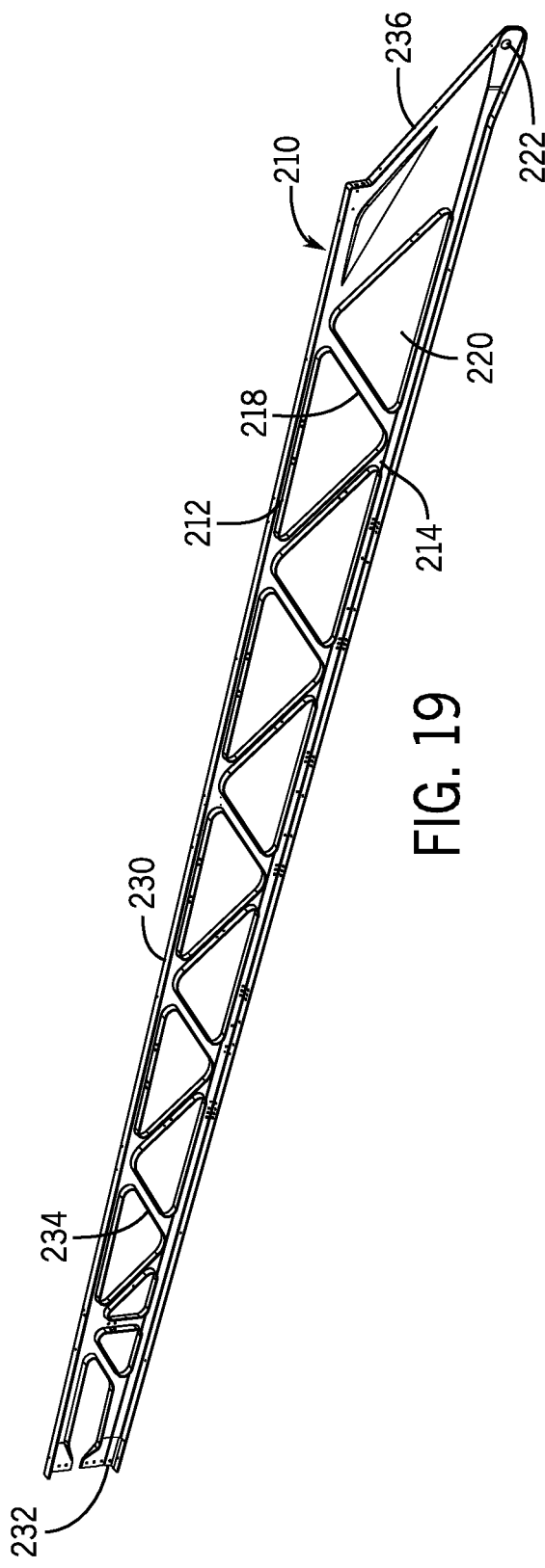

The leading truss panel 210 is more clearly depicted in the isolated views of FIGS. 18 and 19. In particular, FIG. 18 is a front or leading (or exterior) side view of the leading truss panel 210, and FIG. 19 is a rear or trailing (or interior) side view of the leading truss panel 210. As noted above, the leading truss panel 210 has a single-piece composite construction that is primarily formed by a panel wall 212. Generally, the panel wall 212 may be considered planar or flat on each side.

In one example, the panel wall 212 may be considered to be formed by an upper beam 214, lower beam 216, and an array of braces 218. The upper beam 214 extends longitudinally along the length as the upper portion of the panel wall 212. Similarly, the lower beam 216 extends longitudinally along the length as the lower portion of the panel wall 212. The braces 218 extend at angles between the upper and lower beams 214, 216. Collectively, the upper beam 214, lower beam 216, and braces 218 define truss openings 220. The truss openings 220 are arranged in an array or row along at least a portion of the length of the leading truss panel 210. The upper beam 214 and lower beam 216 may be approximately parallel to one another, although in the depicted example, the overall height of the panel wall 212 may taper or otherwise decrease along the length from the inner end to the outer end (e.g., such that the upper beam 214 and/or lower beam 216 are slightly angled relative to one another or relative to horizontal).

The braces 218 (and resulting sides of the truss openings 220) may extend at any suitable angle relative to the upper and/or lower beams 214, 216. In one example, one or more the braces 218 are at approximately 60° relative to the upper and/or lower beams 214, 216 in alternating directions (e.g., 60° and 120° in a common direction), thereby forming truss openings 220 that are approximately shaped like equilateral triangles. In other examples, the braces 218 may alternate between 45° and 90° between the upper and/or lower beams 214, 216, thereby forming truss openings 220 that are approximately shaped like right triangles. Other brace angles and resulting truss opening shapes may be provided. In the depicted example, the panel wall 212 may include thirteen truss openings 220 (e.g., labeled 220a-220m in FIG. 18, in which truss opening 220a is shaped as a scalene triangle, truss openings 220b-220k are shaped as equilateral triangles with the apexes oriented in alternating vertical directions, and truss openings 2201, 220m are shaped as right triangles). In further examples, the truss openings may have non-triangular shapes.

As best shown by FIG. 19, the leading truss panel 210 further includes a number of ribs 230, 232, 234, 236 that extend from the plane on an interior side of the panel wall 212. In one example, the ribs 230, 232, 234 extend at an angle of approximately 90° from the panel wall 212, although other angles may be provided, and function to add rigidity to the truss panel 210. The ribs 230, 232, 234, 236 may include an upper spar rib 230, a lower spar rib 232, a number of brace ribs 234, and an inner edge rib 236. The upper spar rib 230 extends along the upper edge or periphery of the panel wall 212 to, in effect, form an upper spar of the truss panel 210. The lower spar rib 232 extends along the lower edge or periphery of the panel wall 212 to, in effect, form a lower spar of the truss panel 210. The brace ribs 234 extend along the peripheries of the truss openings 220. The inner edge rib 236 extends from the periphery of the leading truss panel wall 212 along an inner edge. Effectively all features of the truss panel 210 may integrally formed. For example, the mounting positions 222 of one or more of the hinge assemblies (e.g., hinge assemblies 150, 156) may be formed within the truss panel wall 212.

Generally, the ribs 230, 232, 234, 236 of the truss panel 210 (as well as ribs on other portions of the boom segment 140, 142, 144) function to increase the strength of the leading truss panel 210, e.g., to mitigate or prevent twisting, bending, or buckling of the truss panel 210. Collectively, the beams 214, 216 and braces 218 form an overall truss structure that is reinforced by the ribs 230, 232, 234, 236. The planar nature of the panel wall 212, the array of braces 218 defining the truss openings 220, and the rigidifying ribs 230, 232, 234, 236 within an integral truss panel 210 provide a relatively strong structure for the boom segment 140 at a relatively light weight, particularly in view the fiber composite material or materials used to form the truss panel 210, as described in greater detail below.

Figure 22:
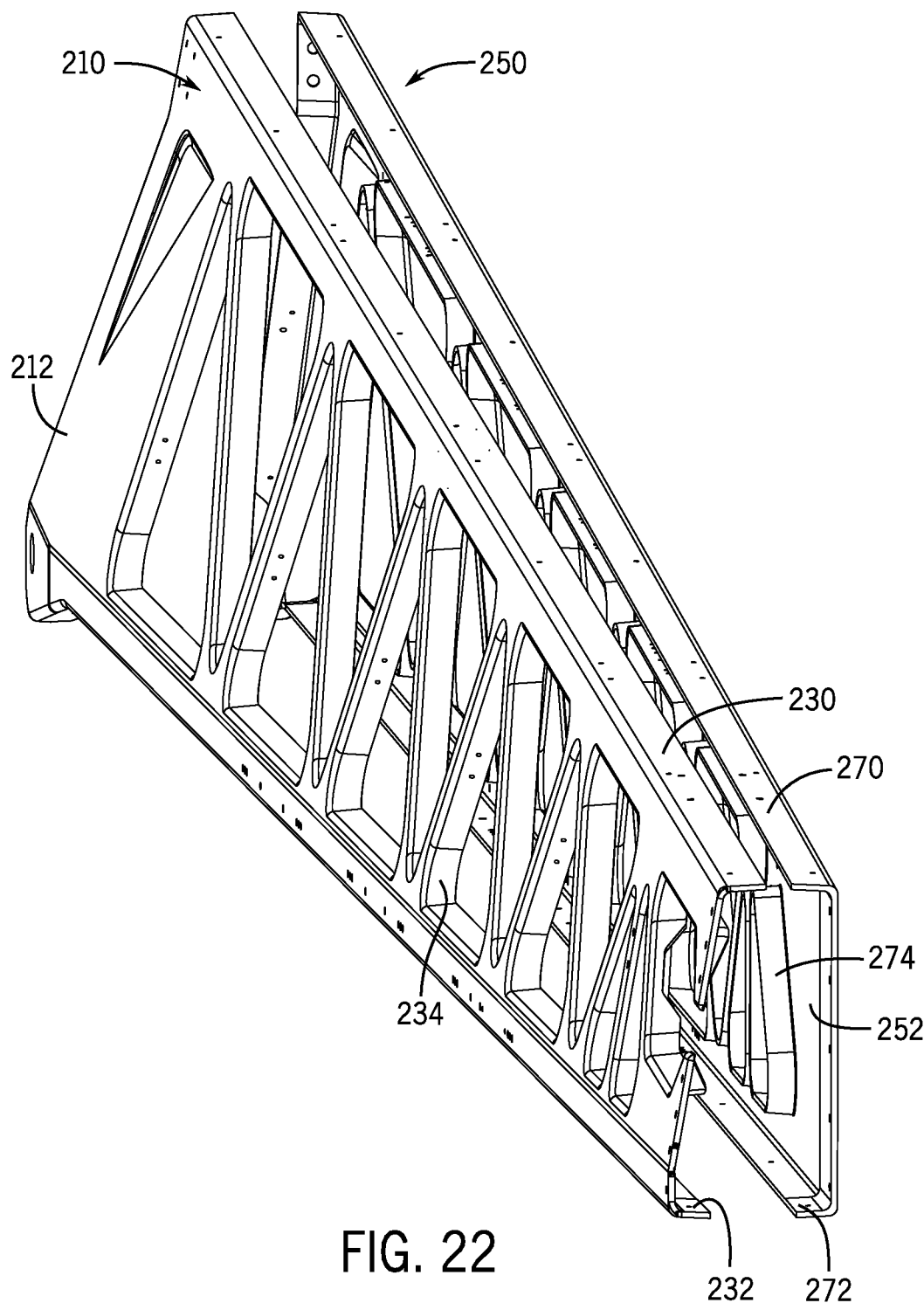
FIG. 22 is an end isometric view of the leading and trailing truss panels of the inner boom segment of FIG. 4 in accordance with an example embodiment.

Reference is now made to FIGS. 20 and 21, which are a front or leading (or exterior) side view and a rear or trailing (or interior) side view of the trailing truss panel 250, respectively. Generally, the trailing truss panel 250 is constructed as a mirror image of the leading truss panel 210, although the panels 210, 250 may have differences. Reference is briefly made to FIG. 22, which depicts an isometric view of the leading and trailing truss panels 210, 250, arranged in an assembled position but otherwise isolated from other components of the inner boom segment 140.

Returning to FIGS. 20 and 21, as above, the trailing truss panel 250 has a single-piece composite construction that is primarily formed by a panel wall 252 that may be considered planar or flat on each side. Similarly, the panel wall 252 may be considered to be formed by an upper beam 254, a lower beam 256, and an array of braces 258. The upper beam 254 extends longitudinally along the length as the upper portion of the panel wall 252. The lower beam 256 extends longitudinally along the length as the lower portion of the panel wall 252, and the braces 258 extend at angles between the upper and lower beams 254, 256. Collectively, the upper beam 254, lower beam 256, and braces 258 define truss openings 260 arranged in an array or row along at least a portion of the length of the trailing truss panel 250. In this example, the beams 254, 256, braces 258, and openings 260 match the shape and configuration of those in the leading truss panel 210.

As best shown by FIG. 21, the trailing truss panel 250 further includes a number of ribs 270, 272, 274, 276 that extend from the plane on an interior side of the panel wall 252. The ribs 270, 272, 274, 276 include an upper spar rib 270, a lower spar rib 272, a number of brace ribs 274, and an inner edge rib 276. The upper spar rib 270 extends along the upper edge or periphery of the panel wall 252 to, in effect, form an upper spar of the truss panel 250. The lower spar rib 272 extends along the lower edge or periphery of the panel wall 252 to, in effect, form a lower spar of the truss panel 250. The brace ribs 274 extend along the peripheries of the truss openings 260. The inner edge rib 276 extends from the periphery of the trailing truss panel wall 252 along an inner edge. Effectively all features of the truss panel 250 are integrally formed. For example, the mounting positions 262 of one or more of the hinge assemblies (e.g., hinge assemblies 150, 156) may be formed within the truss panel wall 252.

Collectively, the beams 254, 256 and braces 258 form an overall truss structure that is reinforced by the ribs 270, 272, 274, 276. The planar nature of the panel wall 252, the array of braces 258 defining the truss openings 260, and the rigidifying ribs 270, 272, 274, 276 within an integral truss panel 250 provide a relatively strong components for the boom segment 140 at a relatively light weight, particularly considering the fiber composite material or materials used to form the truss panel 250, as described in greater detail below.

Additional components of the inner boom segment 140 are depicted in the isometric views of FIGS. 23-25. In particular, the view of FIG. 23 depicts one of the upper panels 280 in isolation. As shown, the upper panel 280 is generally planar with edges that are configured to be secured to the panels 210, 250. The view of FIG. 24 depicts one of the lower panels 282 in isolation. As shown, the lower panel 282 is generally planar with raised edges that are configured to be secured to the leading and trailing panels 210, 250. The assembly of the panels 210, 250, 280, 282 is more clearly depicted in the partial view of FIG. 15. As shown, the upper panels 280 span the leading and trailing panels 210, 250, and in particular, the upper panel 280 is secured to the upper spar rib 230 of the leading panel 210 and the upper spar rib 270 of the trailing panel 250. Similarly, the lower panels 282 span the leading and trailing panels 210, 250, and in this example, the lower panel 282 has edges that extend across the lower spar ribs 232, 272 and at least partially around the exterior of the leading and trialing panels 210, 250. The view of FIG. 25 is an isometric view of an end panel 284 isolated from other components of the inner boom segment 140. As shown, the end panel 284 is generally planar. Further referring to the end view of FIG. 11, the end panel 284 spans the leading and trialing panels 210, 250, and in particular, the end panel 284 has edges that are secured to the inner edge ribs 236, 276.

Figure 26:
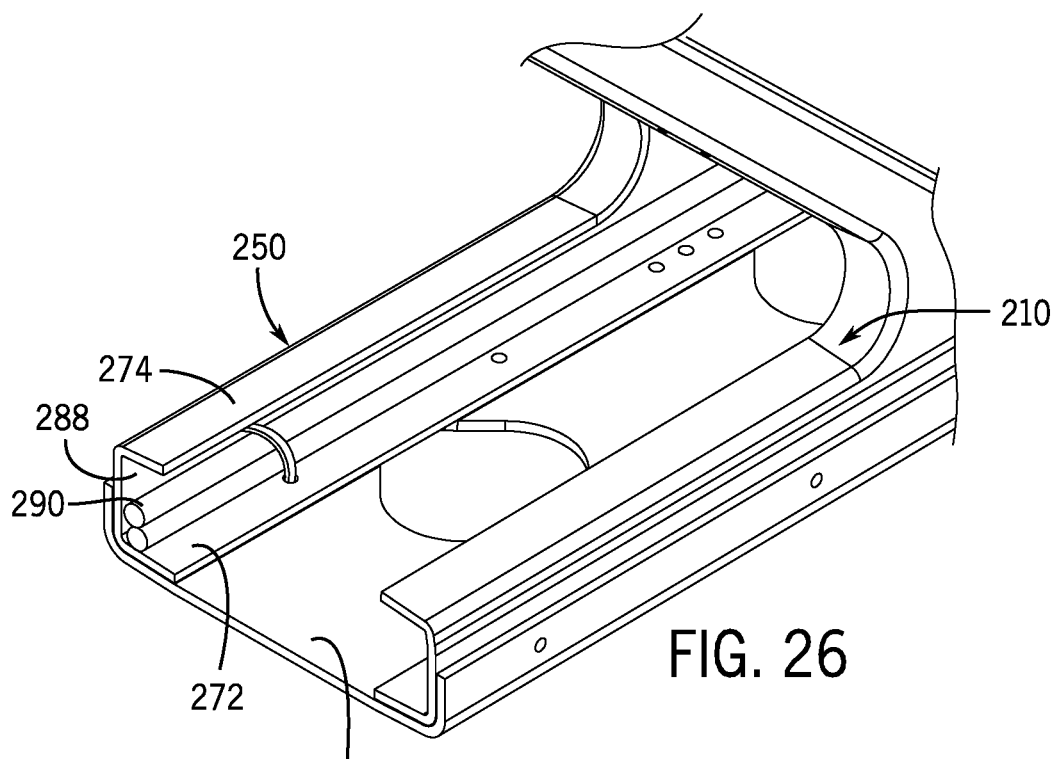
FIG. 26 is a sectional isomeric view of the inner boom segment of FIG. 4 depicting a portion of spray equipment in accordance with an example embodiment.

In addition to the structural consideration discussed in greater detail below, the panels 210, 250, both individually and collectively as the boom segment 140, form at least a partial housing or enclosure for the spray equipment 130 (FIG. 2). In particular, and as reflected in the view of FIG. 22, the panels 210, 250 define an overall interior cavity to provide protection to the spray equipment 130 (not shown in FIG. 22) housed in between. Moreover, truss panel walls 212, 252 and ribs 230, 232, 234, 236, 270, 272, 274, 276 form partially open channels within the interior cavity to further house or enclose the spray equipment 130. One such example is depicted in FIG. 26, which is partial sectional view of the lower edges of the truss panels 210, 250 as joined together by the lower panel 282. In the example of FIG. 26, a channel 288 is formed by portions of the brace ribs 274 and lower spar rib 272 to at least partially house or enclose conduits or lines 290 (e.g., portions of the spray equipment 130 of FIG. 2).

As noted above, the truss panels 210, 250 may be formed by a fiber composite material, in particular as a composite laminate created as an assembly of layers of fibrous composite materials. Generally, each fiber composite layer includes a substrate or fiber component arranged within a matrix. The matrix may be a resin, such one or more of an epoxy resin, phenolic resin, or polyester resin. The fiber component may be one or more of carbon, glass, aramid, boron, ceramics, or natural fibers.

To form each of the truss panels 210, 250, individual or collective fiber composite layers are arranged on a mold and subsequent layers are overlaid to "build-up" the thickness of the truss panel form, as appropriate. In some examples, the fiber composite layers are heated and subject to vacuum (or pressed) to thermoform the layers against the mold. Further curing or thermosetting steps may be provided. As context, the vacuum thermoforming process may be used to form each of the truss panels 210, 250 (including the truss panel walls 212, 252 and ribs 230, 232, 234, 236, 270, 272, 274, 276) as an integral or unitary structure (e.g., without joints or seams). The laminate structure may be formed by layers of similar or dissimilar materials, as appropriate, and the layering may be performed by hand or automated.

The constituent materials, orientation, and collection of fiber composite layers may be selected or "tuned" to provide desired structural characteristics to the entire panel 210, 250, as well as desired characteristics to individual sections or portions of the panel 210, 250. In particular, different portions of the panels 210, 250 may have different number of layers to result in variations of thickness across the panels 210, 250. As examples, portions of the panels 210, 250 that are subject to increased stress may be formed with increased thicknesses, including at more interior portions subject to larger moments of force, joint or connection areas, and/or mounting positions.

Figure 27:
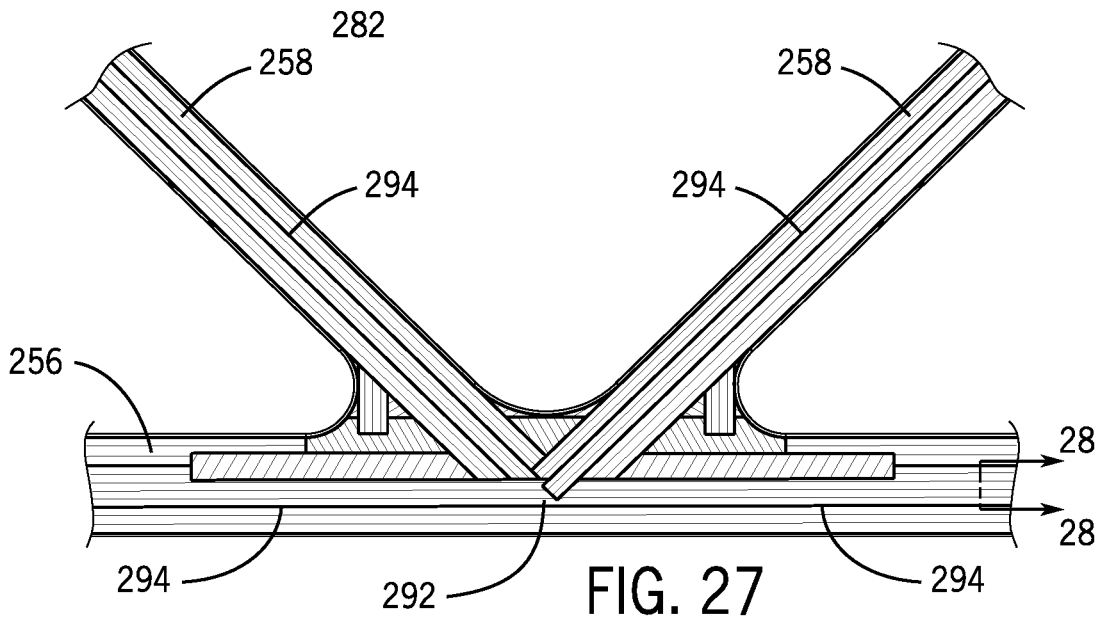
FIG. 27 is a close-up, partially schematic side view of a portion of the inner boom segment of FIG. 4 depicting composite layers with fiber orientation lines in accordance with an example embodiment.

The orientation of the fibers of the composite layers may also impart localized structural characteristics, particularly directional strength properties. Specifically, the orientation of the fibers may be aligned with the direction of anticipated stress. One simple example is depicted in the view of FIG. 27, which is a partial side view of the trailing truss panel 250. The view of FIG. 27 particularly depicts two braces 258 intersecting the lower beam 256 of the panel wall 212 to form a node 292. The view of FIG. 27 also includes a schematic representation of various example layers 294 of the laminate, including exaggerated fiber orientation lines to reflect the alignment and orientation of some of the fibers within the overlapping constituent fiber composite layers 294. As shown, the fiber orientation lines of the layers 294 may extend along the lengths of the respective braces 258 and beam 256 and further be arranged to cross one another at the node 292 to provide desirable strength characteristics at an area that may be subject to elevated stress concentrations.

Figure 28:
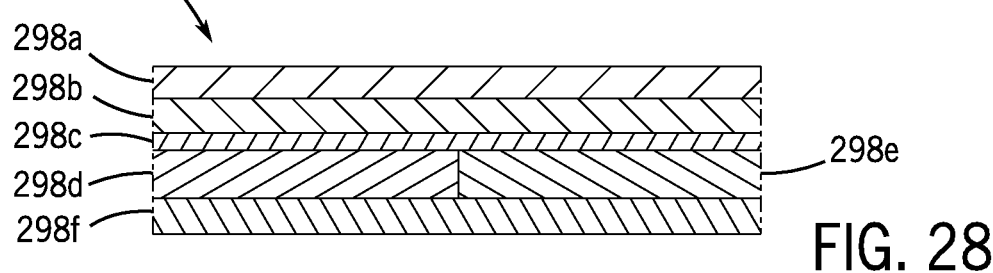
FIG. 28 is a cross-sectional view of a portion of the inner boom segment through line 28-28 of FIG. 27.

An example laminate 296 is also depicted in FIG. 28, which is a cross-sectional view of a portion of the inner boom segment through line 28-28 of FIG. 27. As noted above, the laminate 296 is formed by a number of layers 298a-298f, six of which are shown. As also noted, the various layers 298a-298f may have various material properties, including different matrix and/or fiber compositions, layer thickness and orientations, and fiber diameters, orientations, spacing, and/or density within each layer 298a-298f. Moreover, the laminate 296 may be homogeneous or heterogeneous through a thickness (e.g., similar or different layers at a common point in a panel), homogeneous throughout a panel (e.g., a common laminate structure across a panel), and/or varied at specific locations (e.g., variations of thickness, constituent layers, or fiber orientation at areas with particularly high or low stress concentration).

The other components of the boom segments 140, 142, 144, such as the upper panels 280, lower panels 282, and end panels 284, may be formed in any suitable manner, including from the fiber composite materials described above. In other examples, the other components of the boom segments 140, 142, 144 may be formed in other ways, such as by castings.

Although the inner boom segment 140 is described in detail above, the other boom segments 142, 144 may have similar structural configurations. In particular, the outer and breakaway boom segments 142, 144 may be formed of truss panels with a wall that defines upper and lower beams and truss braces extending between the upper and lower beams to define truss openings, as well as ribs extending from the wall about the peripheries or edges of the beams and braces to add rigidity. Moreover, such truss panels may be formed according to the fiber composite laminate processes and structures described above. The truss panels of the outer and/or breakaway boom segments 142, 144 may be formed of similar or dissimilar materials relative to the inner boom segment 140 or relative to one another. In particular, the inner boom segment 140 may be formed with a greater number of higher strength (and higher price) carbon fiber composite layers as compared to the outer boom segment 142 and particularly as compared to the breakaway boom segment 144.

Accordingly, the individual segments of the spray implement described herein may be primarily formed from unitary truss panels, each having a panel wall and a series of ribs, that provide a truss structure. The truss panels may have laminate layers selected and applied to provides desired structural characteristics in designated areas. This enables horizontal folding of the segments to result in a relatively narrow width (as measured across the work vehicle) when folded into its stowed state or position.

The following examples are further provided and numbered for ease of reference.

1. A boom segment for a spray boom assembly configured to carry a spray system of a work vehicle, the boom segment comprising: a truss panel formed as a unitary structure composed of fiber composite material and configured to support components of the spray system, the truss panel including: a panel wall extending along a length of the truss panel and defining an upper beam, a lower beam, and an array of braces spaced apart and extending diagonally and seamlessly between the upper beam and the lower beam to define a series of truss openings therebetween; and a plurality of rigidifying ribs formed integrally with and projecting at an angle from the panel wall.

2. The boom segment of example 1, wherein the plurality of rigidifying ribs include: a first rib extending along the length of the panel wall proximate or at an upper edge of the upper beam to define an upper spar; and a second rib extending along the length of the panel wall proximate or at a lower edge of the lower beam to define a lower spar.

3. The boom segment of example 2, wherein the plurality of rigidifying ribs further includes a plurality of third ribs that extend along peripheries of the truss openings.

4. The boom segment of example 3, wherein the lower spar and a lower portion of the third ribs cooperate to define a channel extending the length of the truss panel sized to contain lines associated with the spray system.

5. The boom segment of example 1, further including a hinge at an inner end of the boom segment, the hinge including a hinge mount coupled to or formed in the panel wall of the truss panel.

6. The boom segment of example 1, wherein the truss panel is formed of a laminate of carbon fiber layers.

7. The boom segment of example 6, wherein the laminate of carbon fiber layers has a plurality of layers with different material properties including one or more of layer thickness, fiber type, and fiber orientation.

8. The boom segment of example 6, wherein the laminate varies at one or more predetermined locations of the truss panel.

9. The boom segment of example 8, wherein the one or more predetermined locations include an area of increased stress concentration where the laminate thickness is of increased thickness.

10. The boom segment of example 8, wherein the one or more predetermined locations include an area of increased stress concentration where one or more layers of the laminate are oriented so that fibers align with lines of tension within the truss panel at the areas of increased stress concentration.

11. The boom segment of example 6, wherein the truss panel is formed by vacuum pressing the laminate of carbon fiber layers.

12. The boom segment of example 1, wherein the truss panel is a first truss panel, and the boom segment further comprises: a second truss panel formed as a unitary structure composed of fiber composite material, the second truss panel including: a second panel wall extending along a length of the second truss panel and defining a second upper beam, a second lower beam, and a second array of braces spaced apart and extending diagonally and seamlessly between the second upper beam and the second lower beam to define a second series of truss openings therebetween; and a second plurality of rigidifying ribs formed integrally with and projecting at an angle from the second panel wall; wherein the first truss panel is coupled to the second truss panel to form a boom segment interior sized and configured to support components of the spray system.

13. The boom segment of example 12, further comprising: at least one top panel spanning and joining the first truss panel to the second truss panel at top sides thereof; and at least one bottom panel spanning and joining the first truss panel to the second truss panel at bottom sides thereof.

14. A spray boom assembly for a work vehicle having a spray system, the spray boom assembly comprising: an inner boom segment having an outer end and including a truss panel formed as a unitary structure composed of fiber composite material and configured to support components of the spray system, the truss panel of the inner boom segment including: a panel wall extending along a length of the truss panel and defining an upper beam, a lower beam, and an array of braces spaced apart and extending diagonally and seamlessly between the upper beam and the lower beam to define a series of truss openings therebetween; and a plurality of rigidifying ribs formed integrally with and projecting at an angle from the panel wall; and an outer boom segment having an inner end movably coupled to the outer end of the inner boom segment, the outer boom segment including a truss panel formed as a unitary structure composed of fiber composite material and configured to support components of the spray system, the truss panel of the outer boom segment including: a panel wall extending along a length of the truss panel and defining an upper beam, a lower beam, and an array of braces spaced apart and extending diagonally and seamlessly between the upper beam and the lower beam to define a series of truss openings therebetween; and a plurality of rigidifying ribs formed integrally with and projecting at an angle from the panel wall.

15. The spray boom assembly of example 14, wherein for each of the inner boom segment and the outer boom segment the plurality of rigidifying ribs of the truss panel include: a first rib extending along the length of the panel wall proximate or at an upper edge of the upper beam to define an upper spar; a second rib extending along the length of the panel wall proximate or at a lower edge of the lower beam to define a lower spar; and a plurality of third ribs that extend along peripheries of the series of truss openings; wherein the lower spar and a lower portion of the third ribs cooperate to define a channel extending the length of the truss panel sized to contain lines associated with the spray system As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A boom segment for a spray boom assembly configured to carry a spray system of a work vehicle, the boom segment comprising:
    a truss panel formed as a unitary structure composed of fiber composite material and configured to support components of the spray system, the truss panel including:
        a panel wall extending along a length of the truss panel and defining an upper beam, a lower beam, and an array of braces spaced apart and extending diagonally and seamlessly between the upper beam and the lower beam to define a series of truss openings therebetween; and
        a plurality of rigidifying ribs formed as a unitary part of, and projecting at an angle from, the panel wall along peripheries of the truss openings.

2. The boom segment of claim 1, wherein the plurality of rigidifying ribs include:
    a first rib extending along the length of the panel wall proximate or at an upper edge of the upper beam to define an upper spar; and
    a second rib extending along the length of the panel wall proximate or at a lower edge of the lower beam to define a lower spar.

3. The boom segment of claim 2, wherein the lower spar and a lower portion of the ribs extending along the peripheries of the truss openings cooperate to define a channel extending the length of the truss panel sized to contain lines associated with the spray system.

4. The boom segment of claim 1, further including a hinge at an inner end of the boom segment, the hinge including a hinge mount coupled to or formed in the panel wall of the truss panel.

5. The boom segment of claim 1, wherein the truss panel is formed of a laminate of carbon fiber layers.

6. The boom segment of claim 5, wherein the laminate of carbon fiber layers has a plurality of layers with different material properties including one or more of layer thickness, fiber type, and fiber orientation.

7. The boom segment of claim 5, wherein the laminate varies at one or more predetermined locations of the truss panel.

8. The boom segment of claim 7, wherein the one or more predetermined locations include an area of increased stress concentration where the laminate thickness is of increased thickness.

9. The boom segment of claim 7, wherein the one or more predetermined locations include an area of increased stress concentration where one or more layers of the laminate are oriented so that fibers align with lines of tension within the truss panel at the areas of increased stress concentration.

10. The boom segment of claim 5, wherein the truss panel is formed by vacuum pressing the laminate of carbon fiber layers.

11. The boom segment of claim 1, wherein the truss panel is a first truss panel, and the boom segment further comprises:
a second truss panel formed as a unitary structure composed of fiber composite material, the second truss panel including:
a second panel wall extending along a length of the second truss panel and defining a second upper beam, a second lower beam, and a second array of braces spaced apart and extending diagonally and seamlessly between the second upper beam and the second lower beam to define a second series of truss openings therebetween; and
a second plurality of rigidifying ribs formed integrally with and projecting at an angle from the second panel wall;
wherein the first truss panel is coupled to the second truss panel to form a boom segment interior sized and configured to support components of the spray system.

12. The boom segment of claim 11, further comprising:
at least one top panel spanning and joining the first truss panel to the second truss panel at top sides thereof; and
at least one bottom panel spanning and joining the first truss panel to the second truss panel at bottom sides thereof.

13. A spray boom assembly for a work vehicle having a spray system, the spray boom assembly comprising:
an inner boom segment having an outer end and including a truss panel formed as a unitary structure composed of fiber composite material and configured to support components of the spray system, the truss panel of the inner boom segment including:
a panel wall extending along a length of the truss panel and defining an upper beam, a lower beam, and an array of braces spaced apart and extending diagonally and seamlessly between the upper beam and the lower beam to define a series of truss openings therebetween; and
a plurality of rigidifying ribs formed as a unitary part of, and projecting at an angle from, the panel wall along peripheries of the truss openings; and
an outer boom segment having an inner end movably coupled to the outer end of the inner boom segment, the outer boom segment including a truss panel formed as a unitary structure composed of fiber composite material and configured to support components of the spray system, the truss panel of the outer boom segment including:
a panel wall extending along a length of the truss panel and defining an upper beam, a lower beam, and an array of braces spaced apart and extending diagonally and seamlessly between the upper beam and the lower beam to define a series of truss openings therebetween; and
a plurality of rigidifying ribs formed as a unitary part of, and projecting at an angle from, the panel wall along peripheries of the truss openings.

14. The spray boom assembly of claim 13, wherein for each of the inner boom segment and the outer boom segment the plurality of rigidifying ribs of the truss panel include:
a first rib extending along the length of the panel wall proximate or at an upper edge of the upper beam to define an upper spar; and
a second rib extending along the length of the panel wall proximate or at a lower edge of the lower beam to define a lower spar;
wherein the lower spar and a lower portion of the ribs extending along the peripheries of the truss openings cooperate to define a channel extending the length of the truss panel sized to contain lines associated with the spray system.

15. The spray boom assembly of claim 14, wherein for each of the inner boom segment and the outer boom segment the truss panel is formed of a laminate of carbon fiber composite layers.

16. The spray boom assembly of claim 15, wherein the laminate of carbon fiber composite layers has a plurality of layers with different material properties including one or more of layer thickness, fiber type and fiber orientation.

17. The spray boom assembly of claim 16, wherein the laminate varies at one or more predetermined locations of the truss panel.

18. The spray boom assembly of claim 17, wherein the one or more predetermined locations include an area of increased stress concentration where the laminate thickness is of increased thickness.

19. The spray boom assembly of claim 13, wherein the truss panel of the inner boom segment is a leading truss panel, and wherein the inner boom segment further comprises:
a trailing truss panel formed as a unitary structure composed of fiber composite material, the trailing truss panel including:
a panel wall extending along a length of the trailing truss panel and defining an upper beam, a lower beam, and an array of braces spaced apart and extending diagonally and seamlessly between the upper beam and the lower beam to define a series of truss openings therebetween; and
a plurality of rigidifying ribs formed integrally with and projecting at an angle from the panel wall;
wherein the leading truss panel is coupled to the trailing truss panel to form an inner boom segment interior sized and configured to support components of the spray system; and wherein the truss panel of the outer boom segment is a leading truss panel, and wherein the outer boom segment further comprises:

a trailing truss panel formed as a unitary structure composed of fiber composite material, the trailing truss panel including:
- a panel wall extending along a length of the trailing truss panel and defining an upper beam, a lower beam, and an array of braces spaced apart and extending diagonally and seamlessly between the upper beam and the lower beam to define a series of truss openings therebetween; and
- a plurality of rigidifying ribs formed integrally with and projecting at an angle from the panel wall;
- wherein the leading truss panel is coupled to the trailing truss panel to form an outer boom segment interior sized and configured to support components of the spray system.

\* \* \* \* \*